United States Patent
Ransford et al.

(10) Patent No.: US 12,362,076 B2
(45) Date of Patent: Jul. 15, 2025

(54) POLARIZATION INSENSITIVE STATE PREPARATION OF HIGH NUCLEAR SPIN IONIC QUBITS

(71) Applicant: Quantinuum LLC, Broomfield, CO (US)

(72) Inventors: Anthony Ransford, Broomfield, CO (US); John Gaebler, Golden, CO (US); Fangzhao An, St. Louis Park, MN (US); James Hostetter, Eagan, MN (US); Andrew Schaffer, Chanhassen, MN (US); Lucas Reid Sletten, Robbinsdale, MN (US)

(73) Assignee: Quantinuum LLC, Broomfield, CO (US)

( * ) Notice: Subject to any disclaimer, the term of this patent is extended or adjusted under 35 U.S.C. 154(b) by 381 days.

(21) Appl. No.: 18/050,186

(22) Filed: Oct. 27, 2022

(65) Prior Publication Data

US 2023/0187096 A1    Jun. 15, 2023

Related U.S. Application Data

(60) Provisional application No. 63/265,175, filed on Dec. 9, 2021.

(51) Int. Cl.
*G21K 1/00* (2006.01)
*G06N 10/40* (2022.01)

(52) U.S. Cl.
CPC ............. *G21K 1/003* (2013.01); *G06N 10/40* (2022.01)

(58) Field of Classification Search
CPC ............................... G21K 1/003; G06N 10/40
See application file for complete search history.

(56) References Cited

U.S. PATENT DOCUMENTS 10,997,522 B1    5/2021  Hayes et al.
2022/0138608 A1*  5/2022  Ramette .............. G06F 9/30101
                                                716/100

(Continued)

OTHER PUBLICATIONS

Bruzewicz, Colin, et al., "Trapped-Ion Quantum Computing: Progress and Challenges", Applied Physics Reviews, Apr. 9, 2019, vol. 6, No. 2, retrieved from Cornell University's Online Library Archive on the Internet at <https://arxiv.org/pdf/1904.04178.pdf>, 56 pages.

(Continued)

*Primary Examiner* — Nicole M Ippolito
(74) *Attorney, Agent, or Firm* — Alston & Bird LLP

(57) ABSTRACT

Embodiments relate to initializing and/or performing state preparation for an atomic object. The controller controls first manipulation sources to provide first manipulation signals and second manipulation sources to provide second manipulation signals. The first and second manipulation signals are incident on the atomic object. The atomic object has a nuclear spin greater than one half. A ground state manifold of the atomic object comprises one or more selected ground manifold states and non-selected ground manifold states. The first manipulation signals are configured to drive transitions from the non-selected ground manifold states to one or more pumped manifolds of the atomic object and suppress transitions out of the selected ground manifold states. The second manipulation signals are configured to stimulate the atomic object to decay a pumped manifold into a decayed state, wherein there is a non-zero probability that the decayed state is one of the selected ground manifold states.

20 Claims, 7 Drawing Sheets

(56) References Cited

U.S. PATENT DOCUMENTS

Figure 1:
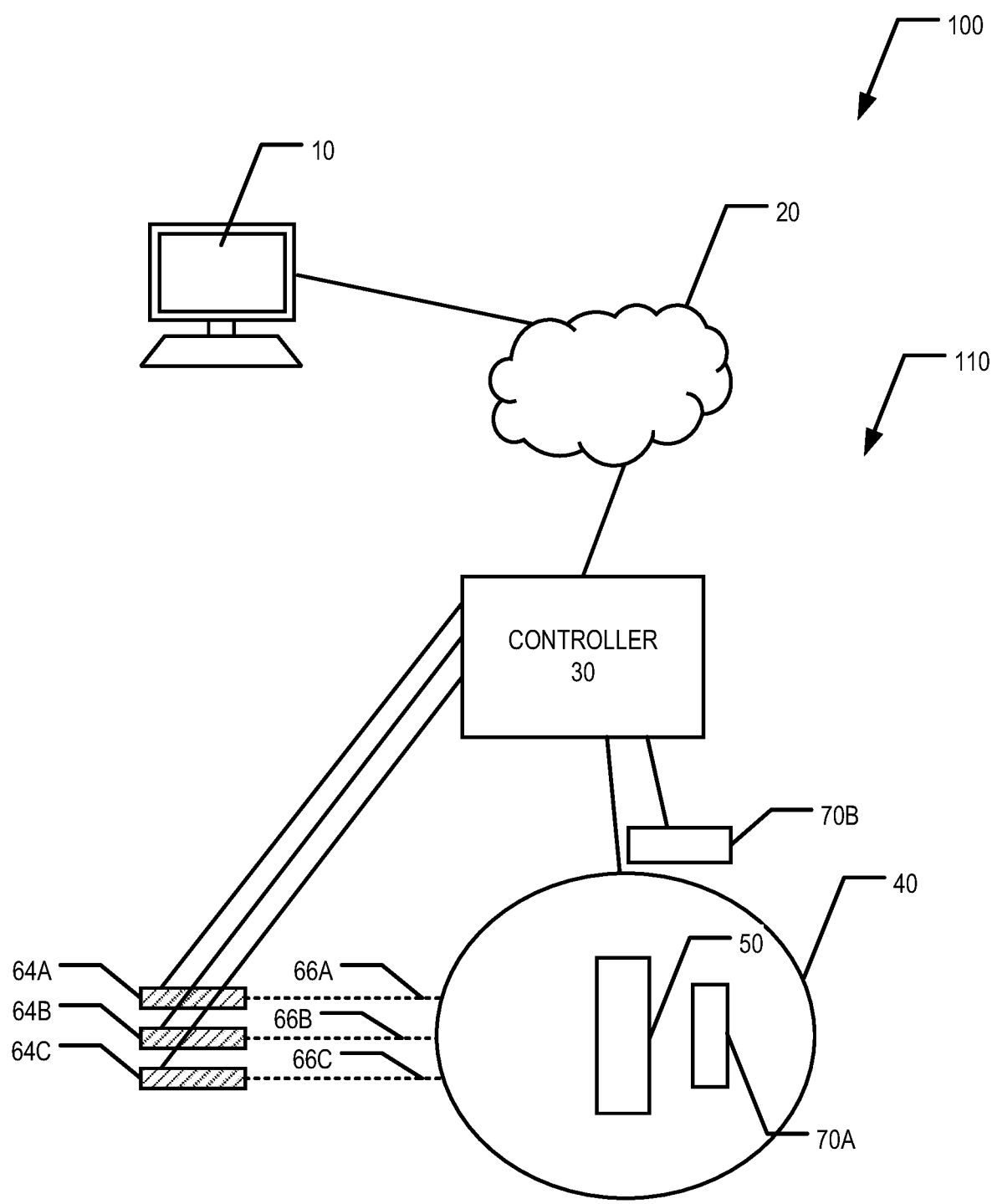

| | | | |
|---|---|---|---|
| 2022/0415036 A1* | 12/2022 | Jo | G06N 3/048 |
| 2024/0185113 A1* | 6/2024 | Cong | G06N 10/70 |
| 2024/0193452 A1* | 6/2024 | Lester | G06N 10/40 |

OTHER PUBLICATIONS

Outgoing—ISA/210—International Search Report Mailed on Jan. 16, 2024 for WO Application No. PCT/US22/052231, 5 page(s).
Outgoing Written Opinion of the ISA Mailed on Jan. 16, 2024 for WO Application No. PCT/US22/052231, 12 page(s).
English Translation of JP Notice of Allowance, including Search Report dated Jun. 3, 2025 for JP Application No. 2024534376, 14 page(s).
JP Notice of Allowance, including Search Report Mailed on Jun. 3, 2025 for JP Application No. 2024534376, 11 page(s).

\* cited by examiner

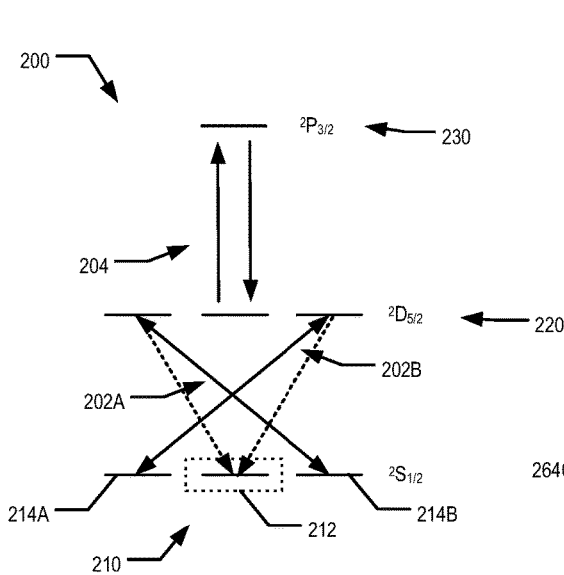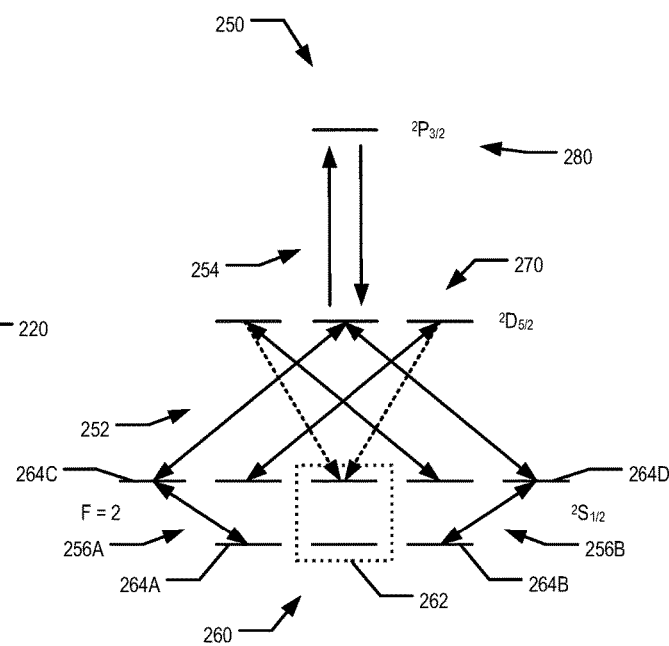
FIG. 2A
FIG. 2B

POLARIZATION INSENSITIVE STATE PREPARATION OF HIGH NUCLEAR SPIN IONIC QUBITS

CROSS-REFERENCE TO RELATED APPLICATIONS

This application claims priority to U.S. Application No. 63/265,175, filed Dec. 9, 2021, the content of which is hereby incorporated by reference in its entirety.

TECHNICAL FIELD

Various embodiments relate to state preparation of ions. For example, various embodiments relate to polarization insensitive state preparation of high nuclear spin ionic qubits for use, for example, in a trapped-ion quantum computer.

BACKGROUND

Various ions have energy structures that are appropriate for use as qubits of a trapped ion quantum computer. Some of these ions, however, have a non-zero nuclear spin. The non-zero nuclear spin leads to Zeeman splitting of the ground state into a number of states. Before the ions can be used as qubits, the ions need to be initialized into the qubit space. Given the large number of energy states that are in the ground level of high nuclear spin ions, the challenges of initializing high nuclear spin ions have conventionally prevented the use of these ions as the qubits of a quantum computer. Through applied effort, ingenuity, and innovation, many deficiencies of conventional state preparation techniques and/or systems have been solved by developing solutions that are structured in accordance with the embodiments of the present invention, many examples of which are described in detail herein.

BRIEF SUMMARY OF EXAMPLE EMBODIMENTS

Example embodiments provide quantum computers, systems, apparatuses, and/or the like and corresponding methods for performing a state of an atomic object having a non-zero nuclear spin. For example, various embodiments provide quantum computers, systems, apparatuses, and/or the like and corresponding methods for preparing an atomic object (e.g., an ion, atom, and/or the like) having a nuclear spin greater than ½ in a selected state of the ground manifold. In various embodiments, first manipulations signals are applied to the atomic object to pump out the non-selected ground manifold state(s) while leaving the selected ground manifold state(s) isolated. For example, the first manipulations signals are configured to couple the non-selected ground manifold state(s) to one or more states in one or more pumped manifolds but to not couple the selected ground manifold state(s) to any states in the one or more pumped manifolds. In various embodiments, second manipulation signals are applied to the atomic object to flush out at least one manifold of the one or more pump manifolds. As a result of the application of the first manipulation signals and/or the second manipulations signals to the atomic object, the probability of the atomic object being in one of the selected ground manifold state(s) increases. As the application of the first manipulation signals and/or second manipulation signals are continued and/or repeated, the probability of the atomic object being in one of the selected ground manifold state(s) increases to substantially equal to one-hundred percent. In various embodiments, the first and/or second manipulations signals are applied to a plurality of atomic objects within the atomic object confinement apparatus.

According to one aspect, a method for initializing an atomic object confined by an atomic object confinement apparatus. In an example embodiment, the method comprises controlling, by a controller associated with the atomic object confinement apparatus, a first manipulation source to provide a first manipulation signal to a particular region of the atomic object confinement apparatus. The atomic object has a nuclear spin greater than one half. A ground state manifold of the atomic object comprises one or more selected ground manifold states and one or more non-selected ground manifold states. The first manipulation signal is configured to drive transitions from at least one of the one or more non-selected ground manifold states to one or more pumped manifolds of the atomic object and suppress transitions out of the selected ground manifold state. In an example embodiment, the method further comprises controlling, by the controller, a second manipulation source to provide a second manipulation signal to the particular region of the atomic object confinement apparatus to stimulate the atomic object to decay from at least one of the one or more pumped manifolds into a decayed state within the ground manifold. There is a non-zero probability that the decayed state is one of the selected ground manifold states. The atomic object to be initialized is located in the particular region of the atomic object confinement apparatus.

In an example embodiment, a polarization of the first manipulation signal is configure to suppress transitions from the one or more selected ground manifold states to the one or more pumped manifolds.

In an example embodiment, a propagation direction of the first manipulation signal is perpendicular to a magnetic field direction in the particular region of the atomic object confinement apparatus.

In an example embodiment, the first manipulation signals comprise intra-manifold signals and inter-manifold signals.

In an example embodiment, the atomic object is a singly ionized barium atom and the intra-manifold signals are characterized by a frequency substantially equal to 8 GHz and the inter-manifold signals are characterized by a wavelength substantially equal to 1762 nm.

In an example embodiment, the one or more selected ground manifold states at least partially define a set of qubit states of the atomic object.

In an example embodiment, the method is performed at least one of (a) prior to the execution of a quantum program by a quantum computer controlled by the controller or (b) to re-initialize an atomic object into a qubit space of the quantum computer during the execution of the quantum program by the quantum computer.

In an example embodiment, the atomic object is a singly ionized barium atom and the second manipulation signals are characterized by at least one of (a) a wavelength substantially equal to 614 nm or (b) a wavelength substantially equal to 493 nm.

According to another aspect, an apparatus is provided. In an example embodiment, the apparatus comprises at least one processor and memory storing computer-executable instructions. The computer-executable instructions are configured to, when executed by the at least one processor, cause the apparatus to at least control a first manipulation source to provide a first manipulation signal to a particular region of an atomic object confinement apparatus. The atomic object has a nuclear spin greater than one half. A ground state manifold of the atomic object comprises one or more selected ground manifold states and one or more non-selected ground manifold states. The first manipulation signal is configured to drive transitions from at least one of the one or more non-selected ground manifold states to one or more pumped manifolds of the atomic object and suppress transitions out of the selected ground manifold states. The computer-executable instructions are configured to, when executed by the at least one processor, cause the apparatus to at least control a second manipulation source to provide a second manipulation signal to the particular region of the atomic object confinement apparatus to stimulate the atomic object to decay from at least one of the one or more pumped manifolds into a decayed state within the ground manifold. There is a non-zero probability that the decayed state is one of the selected ground manifold states. The atomic object to be initialized is located in the particular region of the atomic object confinement apparatus.

In an example embodiment, the apparatus is a controller of a quantum computer comprising the atomic object confinement apparatus, the first manipulation source, and the second manipulation source.

In an example embodiment, a polarization of the first manipulation signal is configure to suppress transitions from the one or more selected ground manifold states to the one or more pumped manifolds.

In an example embodiment, a propagation direction of the first manipulation signal is perpendicular to a magnetic field direction in the particular region of the atomic object confinement apparatus.

In an example embodiment, the first manipulation signals comprise intra-manifold signals and inter-manifold signals.

In an example embodiment, the atomic object is a singly ionized barium atom and the intra-manifold signals are characterized by a frequency substantially equal to 8 GHz and the inter-manifold signals are characterized by a wavelength substantially equal to 1762 nm.

In an example embodiment, the one or more selected ground manifold states at least partially define a set of qubit states of the atomic object.

In an example embodiment, the method is performed at least one of (a) prior to the execution of a quantum program by a quantum computer controlled by the controller or (b) to re-initialize an atomic object into a qubit space of the quantum computer during the execution of the quantum program by the quantum computer.

In an example embodiment, the atomic object is a singly ionized barium atom and the second manipulation signals are characterized by at least one of (a) a wavelength substantially equal to 614 nm or (b) a wavelength substantially equal to 493 nm.

According to another aspect, a system is provided. In an example embodiment, the system comprises an atomic object confinement apparatus configured to confine an atomic object in a particular region of the atomic object confinement apparatus; one or more first manipulation sources controllable by a controller of the system and configured to provide first manipulation signals to the particular region of the atomic object confinement apparatus; one or more second manipulation sources controllable by the controller of the system and configured to provide second manipulation signals to the particular region of the atomic object confinement apparatus; and the controller comprising at least one processor and memory storing computer-executable instructions. The computer-executable instructions are configured to, when executed by the at least one processor, cause the controller to at least control a first manipulation source to provide a first manipulation signal to a particular region of an atomic object confinement apparatus. The atomic object has a nuclear spin greater than one half. A ground state manifold of the atomic object comprises one or more selected ground manifold states and one or more non-selected ground manifold states. The first manipulation signal is configured to drive transitions from at least one of the one or more non-selected ground manifold states to one or more pumped manifolds of the atomic object and suppress transitions out of the selected ground manifold states. The computer-executable instructions are further configured to, when executed by the at least one processor, cause the controller to at least control a second manipulation source to provide a second manipulation signal to the particular region of the atomic object confinement apparatus to stimulate the atomic object to decay from at least one of the one or more pumped manifolds into a decayed state within the ground manifold. There is a non-zero probability that the decayed state is one of the selected ground manifold states. The atomic object to be initialized is located in the particular region of the atomic object confinement apparatus.

In an example embodiment, the system is part of a quantum computer and the first and second manipulation signals are applied to the atomic object at least one of (a) prior to the execution of a quantum program by the quantum computer controlled by the controller or (b) to re-initialize an atomic object into a qubit space of the quantum computer during the execution of the quantum program by the quantum computer.

In an example embodiment, a polarization of the first manipulation signal is configure to suppress transitions from the one or more selected ground manifold states to the one or more pumped manifolds.

In an example embodiment, a propagation direction of the first manipulation signal is perpendicular to a magnetic field direction in the particular region of the atomic object confinement apparatus.

In an example embodiment, the first manipulation signals comprise intra-manifold signals and inter-manifold signals.

In an example embodiment, the atomic object is a singly ionized barium atom and the intra-manifold signals are characterized by a frequency substantially equal to 8 GHz and the inter-manifold signals are characterized by a wavelength substantially equal to 1762 nm.

In an example embodiment, the one or more selected ground manifold states at least partially define a set of qubit states of the atomic object.

In an example embodiment, the method is performed at least one of (a) prior to the execution of a quantum program by a quantum computer controlled by the controller or (b) to re-initialize an atomic object into a qubit space of the quantum computer during the execution of the quantum program by the quantum computer.

In an example embodiment, the atomic object is a singly ionized barium atom and the second manipulation signals are characterized by at least one of (a) a wavelength substantially equal to 614 nm or (b) a wavelength substantially equal to 493 nm.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 provides block diagram of an example atomic object quantum computer, in accordance with an example embodiment.

FIG. 2A provides a diagram illustrating a portion of the energy level structure of an example atomic object where the non-selected ground manifold states are being pumped out and the atomic object is allowed to decay into the selected ground manifold state(s), in accordance with an example embodiment.

FIG. 2B provides a diagram illustrating a portion of the energy level structure of another example atomic object where the non-selected ground manifold states are being pumped out and the atomic object is allowed to decay into the selected ground manifold state(s), in accordance with an example embodiment.

Figure 3:
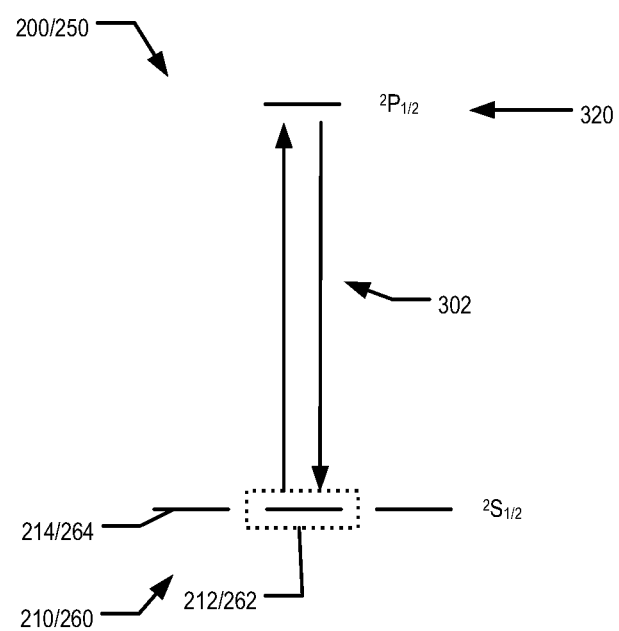

FIG. 3 provides a diagram illustrating a portion of the energy level structure of an example atomic object where the pumped manifold is flushed, in accordance with an example embodiment.

Figure 4:
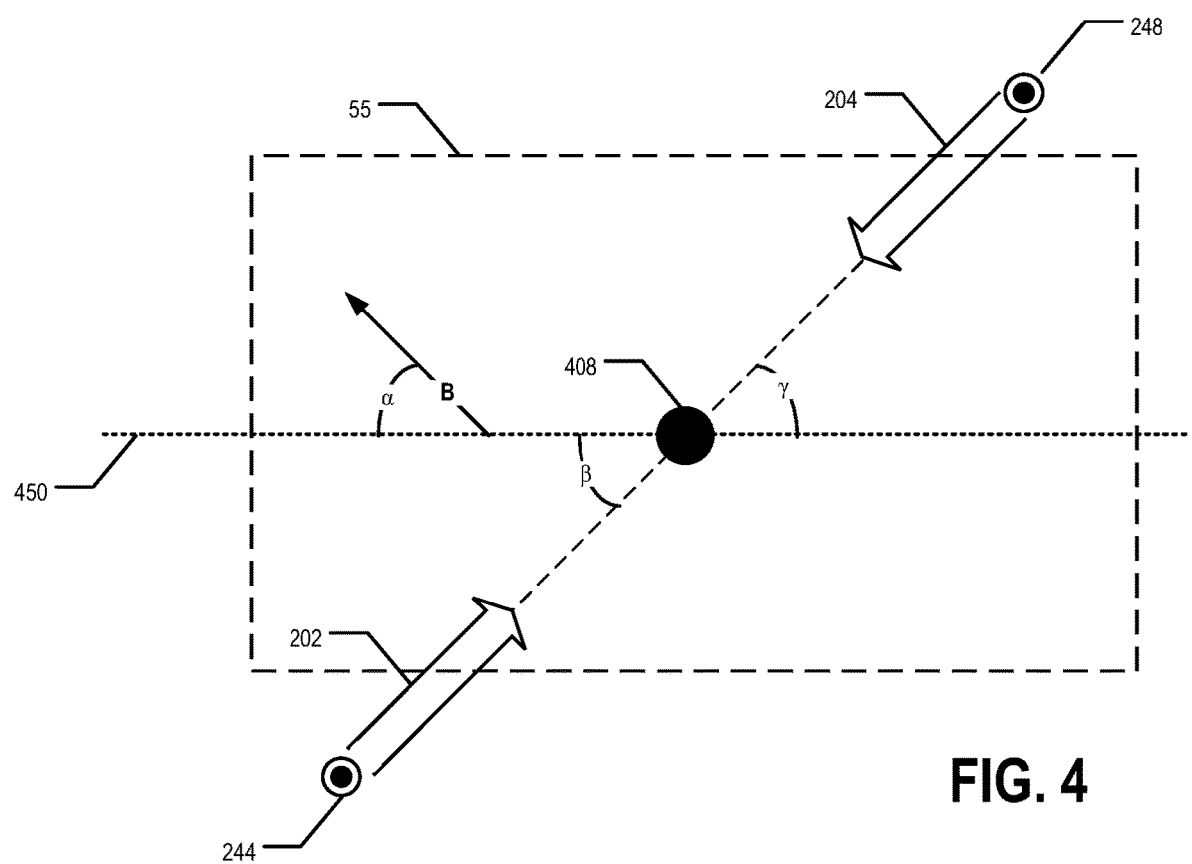

FIG. 4 provides a schematic diagram illustrating first and/or second manipulation signals being incident on an atomic object, in accordance with an example embodiment.

Figure 5:
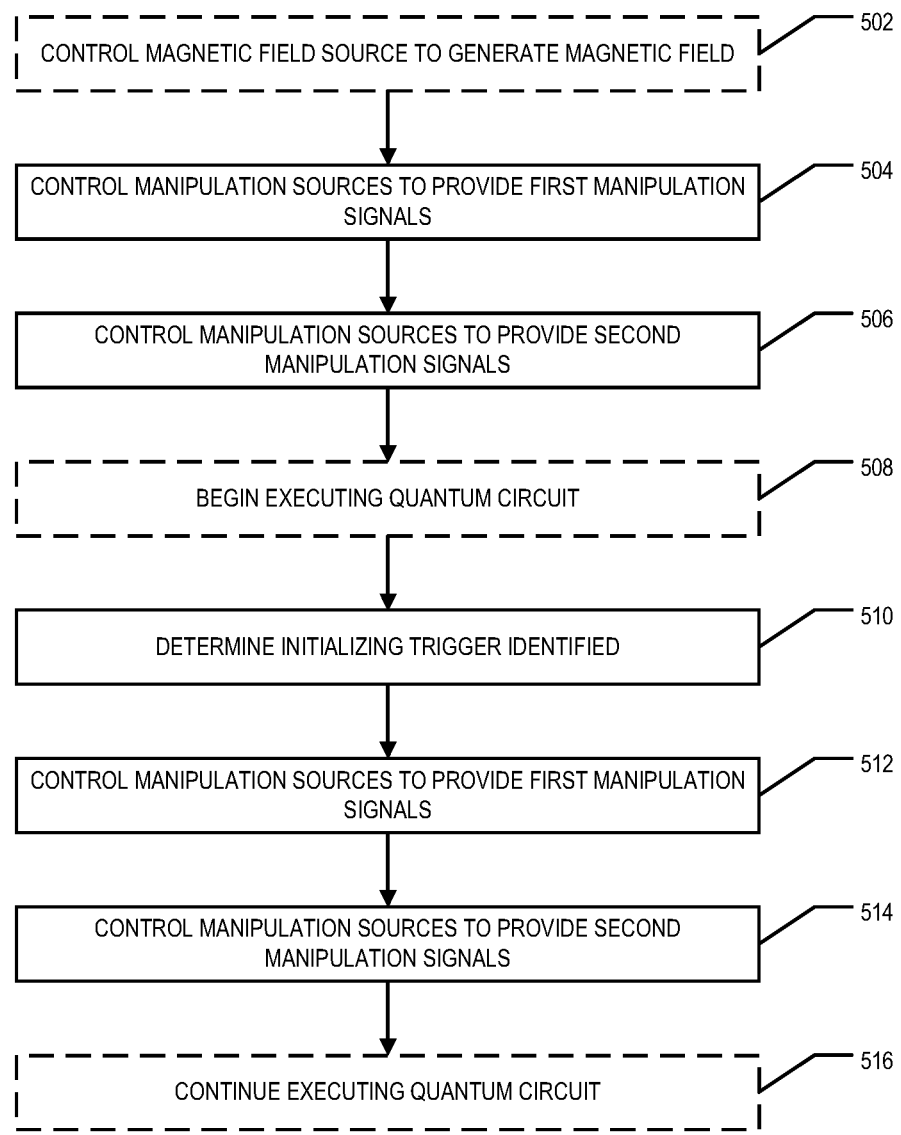

FIG. 5 provides a flowchart illustrating various processes and/or procedures of performed, for example, by a controller of a quantum computer, in accordance with an example embodiment.

Figure 6:
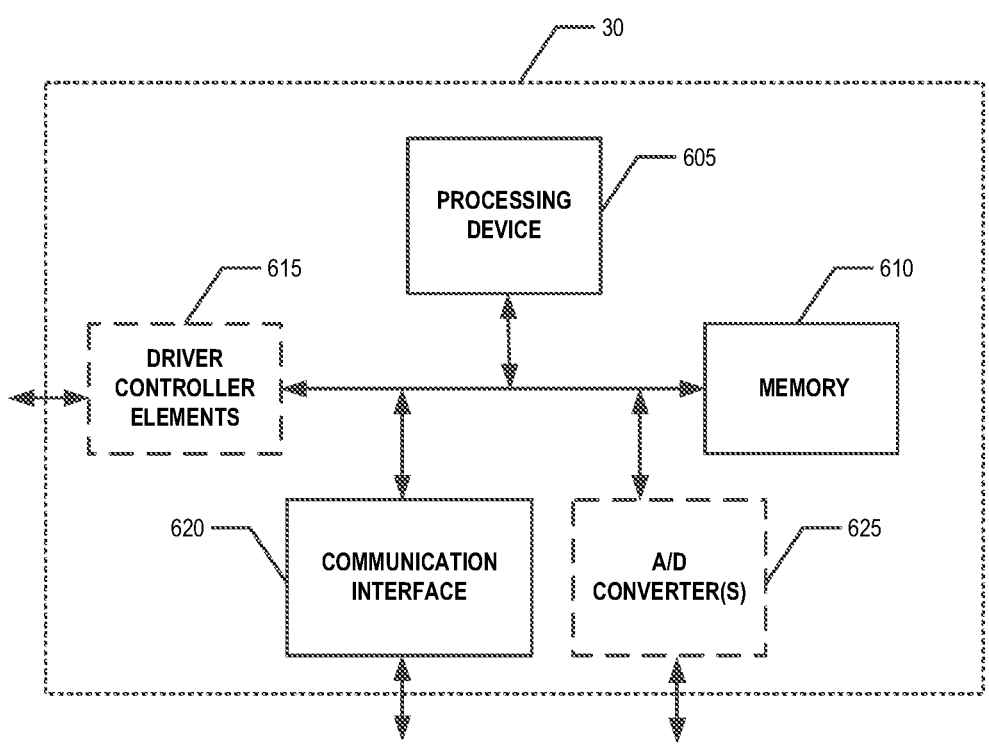

FIG. 6 provides a schematic diagram of an example controller of a quantum computer comprising an atomic object confinement apparatus configured for confining atomic objects therein, in accordance with an example embodiment.

Figure 7:
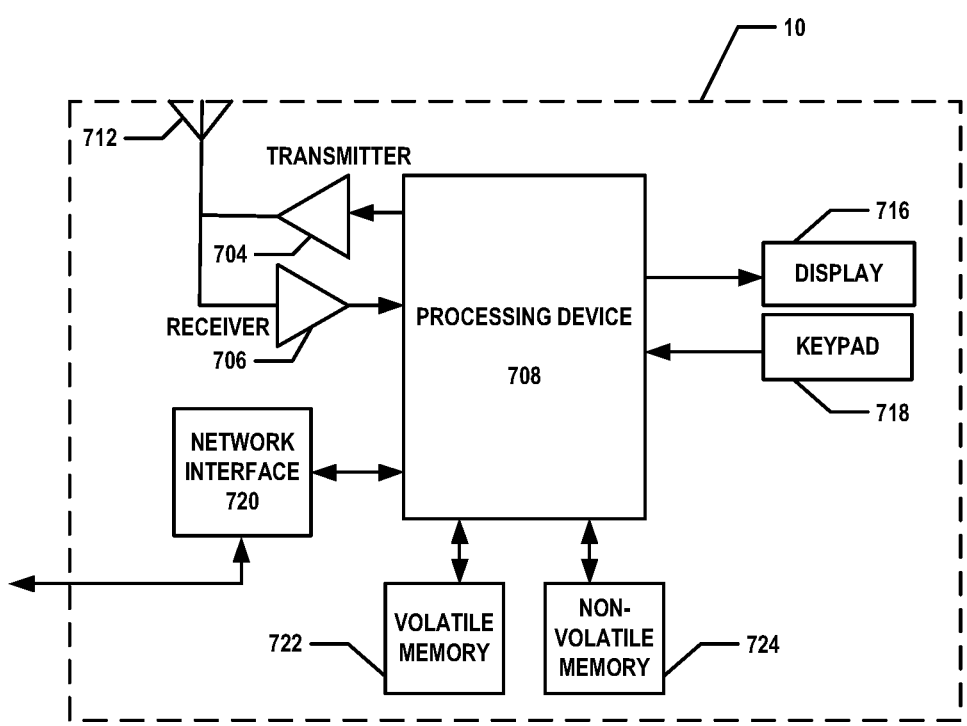

FIG. 7 provides a schematic diagram of an example computing entity of a quantum computer system that may be used in accordance with an example embodiment.

DETAILED DESCRIPTION OF SOME EXAMPLE EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. The terms "generally" and "approximately" refer to within applicable engineering and/or manufacturing tolerances and/or within user measurement capabilities, unless otherwise indicated. Like numbers refer to like elements throughout.

In various scenarios, atomic objects are confined within an atomic object confinement apparatus. In various embodiments, the atomic object confinement apparatus is an ion trap, such as a surface ion trap, Paul ion trap, and/or the like. In various embodiments, the atomic objects are ions, atoms, neutral or charged molecules, and/or the like. In various embodiments, the atomic objects are ions with spin greater than ½. In an example embodiment, the atomic objects are used as qubits of a quantum computer.

In various embodiments, the atomic objects confined within the atomic object confinement apparatus are used to perform experiments, controlled quantum state evolution, quantum computations, and/or the like. In various embodiments, in order for the atomic objects confined within the atomic object confinement apparatus to be used to perform the experiments, controlled quantum state evolution, quantum computations, and/or the like, the atomic objects need to be prepared in a selected state. In various embodiments, the selected state is a state in a ground manifold of the atomic object. In various embodiments, the selected state is within a qubit space defined within the ground manifold of the atomic object.

In atomic objects having a nuclear spin greater than ½, the ground manifold comprises a plurality of states. For example, the ground state of the atomic object is split into a plurality of states (e.g., via Zeeman splitting) to form the ground manifold. For example, the ground manifold comprises states having the same principle quantum number (n) and the same angular momentum quantum number (l). However, the states of the ground manifold have different magnetic quantum numbers ($m_f$). Due to the interaction between the magnetic moment caused by the nuclear spin and the magnetic moment caused by the electron spins of the atomic object, the states having different magnetic quantum numbers ($m_f$) are split into different energy levels. These different energy levels are separated by relatively small energies compared to the energy differences between the ground manifold and one or more pumping manifolds of the atomic object energy level structure.

Given that real world lasers do not have frequency spectra that are perfectly stable Dirac delta functions, it is difficult to address atomic objects that are in a non-selected ground manifold state without perturbing an atomic object that is already in a selected ground manifold state. However, for the atomic object to be used as a qubit of a quantum computer and/or to be used for performing experiments, controlled quantum state evolution, quantum computations, and/or the like, the initial state of the atomic object must be controllable. Therefore, technical problems exists regarding how to initialize an atomic object into a selected ground manifold state. In particular, technical problems exist regarding how to initialize an atomic object into selected ground manifold state when the atomic object has a nuclear spin greater than ½, which leads to additional splitting of the ground manifold of the atomic object based into both fine structure and hyperfine structure.

Embodiments described herein provide technical solutions to these technical problems. In particular, according to various embodiments, first manipulation signals are generated and applied to one or more atomic objects. The first manipulation signals are configured to couple one or more non-selected ground manifold states to states in a pumped manifold. For example, the first manipulation signals are configured to pump atomic objects in one of the one or more non-selected ground manifold states into a pumped manifold state. In various embodiments, there is a non-zero probability that the atomic object will decay from the pumped manifold state into a selected ground manifold state. The first manipulation signals are configured to not couple the selected ground manifold state to any of the pump manifold states. For example, based on the direction of propagation of the first manipulation signals compared to the magnetic field direction, the polarization of the first manipulation signals, and the use of a narrow line manipulation signal that is shifted from resonance for the selected ground manifold state (e.g., with respect to a transition to a pumped manifold state), and/or the like, may be used to suppress the probability that an atomic object will be coupled out of and/or transition out of a selected ground manifold state. In various embodiments, second manipulation signals are generated and applied to the atomic objects. In various embodiments, second manipulation signals are applied to the atomic object to flush out at least one manifold of the one or more pump manifolds. For example, the second manipulation signals may be a dipole signal configured to cause atomic objects to decay from a pumped manifold state into the selected ground manifold state with a non-zero probability. For example, the atomic object may decay from the pumped manifold state to a decay state, where there is a non-zero probability that the decay state is one of the selected ground manifold states.

As the application of the first manipulation signals and/or second manipulation signals are continued and/or repeated, the probability of the atomic object being in one of the selected ground manifold state(s) increases to substantially equal to one-hundred percent. In various embodiments, the first and/or second manipulations signals are applied to a plurality of atomic objects within the atomic object confinement apparatus.

In various embodiments, the selected ground manifold state is a state in a defined qubit space of the atomic object energy level structure. In an example embodiment, the selected ground manifold state is an $m_f=0$ state (e.g., F=2, $m_f=0$; F=1, $m_f=0$; and/or the like). In various embodiments, the one or more pumped manifolds are the $D_{5/2}$ manifold, the $P_{1/2}$ manifold, and/or the $P_{3/2}$ manifold of the atomic object energy level structure.

Thus, various embodiments enable the use of high nuclear spin atomic objects (e.g., atomic objects with spin greater than ½) to be effectively and reliably initialized and/or to be state prepared into a selected ground manifold state. Various embodiments are described using Barium as the high nuclear spin atomic objects. Some other non-limiting examples of possible high nuclear spin atomic objects include Beryllium, Magnesium, Calcium, Strontium, Radium, and/or other elements with nuclear spin greater than ½. Additionally, various embodiments may be used with atomic objects with nuclear spin ½, such as Ytterbium, and/or the like.

Exemplary Quantum Computer System

A wide variety of contexts exist where it may be desired to initialize and/or prepare an atomic object (and/or a plurality of atomic objects) into a selected state (e.g., a selected ground manifold state). One example context is quantum charge-coupled device (QCCD)-based quantum computing. FIG. 1 provides a block diagram of an example quantum computer system 100. In various embodiments, the quantum computer system 100 comprises a computing entity 10 and a quantum computer 110.

In various embodiments, the quantum computer 110 comprises a controller 30, a cryogenic and/or vacuum chamber 40 enclosing an atomic object confinement apparatus 50 having atomic objects confined thereby, and one or more manipulation sources 64 (e.g., 64A, 64B, 64C). In an example embodiment, the one or more manipulation sources 64 may comprise one or more lasers (e.g., optical lasers, microwave sources and/or masers, and/or the like) or another manipulation source. In various embodiments, the one or more manipulation sources 64 are configured to manipulate and/or cause a controlled quantum state evolution of one or more atomic objects within the apparatus 50. For example, a first manipulation source(s) 64A is configured to generate and/or provide first manipulation signals and a second manipulation source(s) 64B is configured to generate and/or provide second manipulation signals, wherein the first and second manipulation signals are configured to collectively cause the atomic object(s) confined by the atomic object confinement apparatus to be initialized and/or state prepared into a selected ground manifold state . . . .

In various embodiments, the atomic object confinement apparatus 50 is an ion trap, such as a surface ion trap, Paul ion trap, and/or the like. In various embodiments, the atomic objects are ions, atoms, neutral or ionic molecules, and/or the like. In an example embodiment, the atomic object has a nuclear spin of greater than ½. In an example embodiment, the atomic object is used as a qubit of a quantum computer. In an example embodiment, the atomic object a singly ionized Ba atom (e.g., $^{137}$Ba).

In an example embodiment, the one or more manipulation sources 64 each provide a manipulation signal (e.g., laser beam and/or the like) to one or more regions of the atomic object confinement apparatus 50 via corresponding beam paths 66 (e.g., 66A, 66B, 66C). In various embodiments, at least one beam path 66 comprises a modulator configured to modulate the manipulation signal being provided to the apparatus 50 via the beam path 66. In various embodiments, the manipulation sources 64, modulator, and/or other components of the quantum computer 110 are controlled by the controller 30.

In various embodiments, the quantum computer 110 comprises one or more magnetic field generators 70 (e.g., 70A, 70B). For example, the magnetic field generator may be an internal magnetic field generator 70A disposed within the cryogenic and/or vacuum chamber 40 and/or an external magnetic field generator 70B disposed outside of the cryogenic and/or vacuum chamber 40. In various embodiments, the magnetic field generators 70 are permanent magnets, Helmholtz coils, electrical magnets, and/or the like. In various embodiments, the magnetic field generators 70 are configured to generate a magnetic field at one or more regions of the atomic object confinement apparatus 50 that has a particular magnitude and a particular magnetic field direction in the one or more regions of the atomic object confinement apparatus 50.

In various embodiments, the controller 30 is configured to control voltage sources, electrical signal sources, and/or drivers controlling the atomic object confinement apparatus 50 and/or transport of atomic objects within the atomic object confinement apparatus 50, a cryogenic system and/or vacuum system controlling the temperature and pressure within the cryogenic and/or vacuum chamber 40, manipulation sources 64, magnetic field generators 70, and/or other systems controlling the environmental conditions (e.g., temperature, humidity, pressure, and/or the like) within the cryogenic and/or vacuum chamber 40 and/or configured to manipulate and/or cause a controlled evolution of quantum states of one or more atomic objects within the atomic object confinement apparatus 50.

In various embodiments, a computing entity 10 is configured to allow a user to provide input to the quantum computer 110 (e.g., via a user interface of the computing entity 10) and receive, view, and/or the like output from the quantum computer 110. The computing entity 10 may be in communication with the controller 30 of the quantum computer 110 and/or one or more classical computers in communication with the controller 30 of the quantum computer 110 via one or more wired or wireless networks 20 and/or via direct wired and/or wireless communications. In an example embodiment, the computing entity 10 may translate, configure, format, and/or the like information/data, quantum computing algorithms, quantum circuits, and/or the like into a computing language, executable instructions, command sets, and/or the like that the controller 30 can understand and/or implement.

Exemplary Initialization and/or State Preparation Operation

Various embodiments provide quantum computers, systems, apparatuses, and/or the like and corresponding methods for initializing and/or performing state preparation for atomic objects. In various embodiments, the atomic objects have nuclear spins of greater than ½, causing the energy level structures of the atomic objects to include a significant number of Zeeman splitting generated states (including in the ground manifold).

FIGS. 2A and 2B provide partial level diagrams for example atomic objects having a nuclear spin of 3/2. As should be understood, the hyperfine structure of atomic objects with various nuclear spins will vary accordingly. The partial level diagram 200 illustrates a ground manifold 210 comprising a selected ground manifold state 212 and a plurality of non-selected ground manifold states 214 (e.g., 214A, 214B). The partial level diagram 250 illustrates a ground manifold 260 comprising selected ground manifold states 262 and a plurality of non-selected ground manifold states 264 (e.g., 264A, 264B, 264C, 264D). The partial level diagrams 200, 250 also illustrate respective $D_{5/2}$ manifolds 220, 270 and respective $P_{3/2}$ manifolds 230, 280. In various embodiments, the pumped manifolds include the respective $D_{5/2}$ manifolds 220, 270 and respective $P_{3/2}$ manifolds 230, 280. Each of the respective $D_{5/2}$ manifolds 220, 270 and respective $P_{3/2}$ manifolds 230, 280 comprise a plurality of states that have been split as part of the respective atomic object's fine structure and/or hyperfine structure.

In the example embodiment illustrated in FIG. 2A, first manipulation signals 202 (e.g., 202A, 202B) are configured to couple non-selected ground manifold states 214 to respective states in the $D_{5/2}$ manifold 220 while not coupling the selected ground manifold states 212 to states in the $D_{5/2}$ manifold 220. For example, the direction of propagation of the first manipulation signals 202 compared to the magnetic field direction, the polarization of the first manipulation signals 202, and the use of a narrow line manipulation signal that is shifted from resonance for the selected ground manifold state (e.g., with respect to a transition to a pumped manifold state), and/or the like, may be used to suppress the coupling of a selected ground manifold state 212 to a D manifold 220 state by the first manipulation signal 202. In an example embodiment, the first manipulation signal 202 is a quadrupole laser beam.

In the example embodiment illustrated in FIG. 2B, the first manipulation signals comprise intra-manifold manipulation signals 256A, 256B and inter-manifold manipulation signals 252. The intra-manifold manipulation signals 256A, 256B are configured to couple first non-selected ground manifold states to second non-selected ground manifold states. The inter-manifold manipulation signals 252 are configured to couple the second non-selected ground manifold states to states in the $D_{5/2}$ manifold 270. Both the intra-manifold manipulation signals 256A, 256B and the inter-manifold manipulation signals 252 are configured to not couple selected ground manifold states 262 to any other states. For example, the direction of propagation of the intra-manifold and inter-manifold manipulation signals 252, 256A, 256B compared to the magnetic field direction, the polarization of the intra-manifold and inter-manifold manipulation signals 252, 256A, 256B, and the use of a narrow line manipulation signal that is shifted from resonance for the selected ground manifold state (e.g., with respect to a transition to a pumped manifold state), and/or the like, may be used to suppress the coupling of a selected ground manifold state 262 to a D manifold 270 state by the intra-manifold and inter-manifold manipulation signal 252, 256A, 256B. For example, with the appropriate choice of the direction of propagation of the intra-manifold and/or inter-manifold manipulation signals 252, 256A, 256B compared to the magnetic field direction, may be used to suppress the coupling of a selected ground manifold state 262 to an unselected ground manifold state 214 and/or to a D manifold 270 state. In various embodiments, the first manipulation signals 202, 252, 256A, 256B are each quadrupole laser beams. In an example embodiment, the intra-manifold manipulation signals 256A, 256B are microwave tones (e.g., with a frequency of 8 GHz in the case where the atomic object is a singly ionized Barium atom). In an example embodiment, the inter-manifold manipulation signals 252 are characterized by the wavelength of 1762 nm (e.g., in the case where the atomic object is a singly ionized Barium atom).

In various embodiments, second manipulation signals 204, 254 are applied to the atomic object. In various embodiments, the second manipulation signals are configured to couple states in the D manifold 220, 270 to states in the P manifold 230, 280. For example, the second manipulation signals may be configured to act as a pumping signal. In an example embodiment, where the atomic object is a singly ionized Barium atom, the second manipulation signal 204, 254 is characterized by a wavelength of 614 nm. For example, for most atomic objects, states in the D manifold are long-lived (e.g., on the order of seconds). For example, in the case of Barium, the lifetime of a D manifold state is approximately 30 seconds. In various embodiments, the second manipulation signal 204, 254 is configured to flush out the D manifold such that, in the presence of the second manipulation signal 204, 254, the D manifold states have lifetimes of less than 1 μs.

FIG. 3 illustrates another example embodiment that includes second manipulation signals 302 that may be used in addition to the second manipulation signals 204, 254 and/or as an alternative to the second manipulation signals 204, 254. For example the second manipulation signal 302 is configured to couple states of the $P_{1/2}$ manifold 320 into the selected ground manifold state(s) 212, 262 to states. For example, the second manipulation signal 302 is configured to flush the states of the $P_{1/2}$ manifold 320 and cause decay of the atomic object into the ground state manifold with a non-zero probability of the atomic object decaying into the selected ground manifold state(s) 212, 262. In an example embodiment, the second manipulation signal 302 is dipole laser beam with a wavelength of 493 nm.

FIG. 4 illustrates one example geometry for performing an initialization and/or state preparation operation of an example embodiment. FIG. 4 shows an atomic object 408 located and/or disposed in particular region 55 of the atomic object confinement apparatus 50. In the illustrated scenario, the atomic object 408 is disposed along a radio frequency null 450 of the particular region 55 of the atomic object confinement apparatus 50. The radio frequency null 450 is the zero-point line of a pseudopotential generated by applying a radio frequency voltage signal to radio frequency electrodes and/or rails of the atomic object confinement apparatus 50.

In various embodiments, a magnetic field B is generated such that in the particular region 55 the magnetic field B has a finite and substantially stable (e.g., not changing with time) amplitude (e.g., 2-10 Gauss and/or 5 Gauss in an example embodiment). In various embodiments, the magnetic field B in the particular region 55 has a magnetic field direction that forms an angle α with the radio frequency null 450. In an example embodiment, the angle α is in a range of 30 to 60 degrees. In an example embodiment, the angle α is approximately 45 degrees.

In various embodiments, the first manipulation signal 202, 252, 256A, 256B has a polarization 244 (e.g., linearly polarized) and defines a first propagation direction. In an example embodiment, the polarization 244 of the first manipulation signal 202, 252, 256A, 256B is substantially perpendicular to the magnetic field direction. In various embodiments, the first propagation direction is transverse to the radio frequency null 450. In an example embodiment, the first manipulation signal 202, 252, 256A, 256B propagates in a first propagation direction that forms an angle β with the radio frequency null 450. In various embodiments, the angle β is in a range of 30 to 60 degrees. In an example embodiment, the angle β is approximately 45 degrees.

In various embodiments, the second manipulation signal 204, 254, 302 has a polarization 248 (e.g., linearly polarized). In an example embodiment, the polarization 248 of the second manipulation signal 204, 254, 302 is transverse to the magnetic field direction. In various embodiments, the second propagation direction is transverse to the radio frequency null 450. In an example embodiment, the second manipulation signal 204, 254, 302 propagates in a second propagation direction that forms an angle γ with the radio frequency null 450. In various embodiments, the angle γ is in a range of 30 to 60 degrees. In an example embodiment, the angle γ is approximately 45 degrees.

In various embodiments, the first propagation direction is substantially parallel or anti-parallel to the second propagation direction. In various embodiments, both the first propagation direction and the second propagation are transverse to the magnetic field direction. In an example embodiment, the first propagation direction and the second propagation direction are substantially perpendicular to the magnetic field direction.

FIG. 4 illustrates one example geometry for initializing and/or performing state preparation of an atomic object in accordance with an example embodiment. As should be understood, other geometries may be used in various other embodiments. For example, in an example embodiment, the magnetic field direction may be parallel or anti-parallel to the radio frequency null 450 and the first and second propagation directions are transverse and/perpendicular to the radio frequency null 450. In an example embodiment, the first propagation direction and the second propagation direction are each parallel to the radio frequency null 450 and the magnetic field direction is transverse and/or perpendicular to the radio frequency null 450. In various embodiments, the magnetic field direction is transverse to both the first and second propagation directions.

FIG. 5 provides a flowchart illustrating various processes, procedures, and/or the like for initializing and/or performing a state preparation of an atomic object, in accordance with various embodiments, in the context of the atomic object being a qubit of a quantum computer. In various embodiments, the processes, procedures, and/or the like illustrated in FIG. 5 are performed by a controller 30 of the quantum computer 110.

Starting at step/operation 502, the controller 30 controls the magnetic field generator 70 to generate a magnetic field in the particular region 55 having a magnetic field direction and a particular amplitude. In an example embodiment, the magnetic field generator 70 is a permanent magnet and the controller 30 need not control the magnetic field generator 70. In an example embodiment, the magnetic field generator 70 is configured to generate and/or maintain a substantially stable magnetic field having a magnetic field direction and a particular amplitude throughout the operation of the quantum computer 110 and/or the performance of a quantum circuit and/or algorithm. Thus, the controller 30 controls the magnetic field generator 70 to maintain the magnetic field in the particular region 55 having the magnetic field direction and the particular amplitude, in an example embodiment.

At block 504, the controller 30 controls the first manipulation source(s) 64A to generate and provide first manipulation signals 202, 252, 256A, 256B to the particular region 55. In various embodiments, the first manipulation signals 202, 252 are characterized by at least a first wavelength $\lambda_1$ corresponding to a transition between the ground state manifold 210, 260 (e.g., non-selected ground manifold states 214, 264) and a D manifold of the atomic object 408. In an example embodiment, the first manipulation signals are characterized by an intra-manifold wavelength $\lambda_m$ configured to couple lower energy states of the non-selected ground manifold states 264 to higher energy states of the non-selected ground manifold states 264. In an example embodiment wherein the atomic object is singly ionized atomic Barium, the first wavelength $\lambda_1$ is substantially equal to 1762 nm and the intra-manifold wavelength $\lambda_m$ is substantially equal to the speed of light divided by 8 GHz. In various embodiments the first manipulation signals are characterized by a polarization that is configured to suppress the coupling of the selected ground manifold states 212, 262 to states of any of the pumped manifolds 220, 230, 270, 280, and/or the like. In an example embodiment, the polarization of the manipulation signal (e.g., 252) characterized by the first wavelength $\lambda_1$ is polarized (e.g., linearly polarized) substantially perpendicular the magnetic field direction. In an example embodiment, the system is not sensitive or dependent on the polarization of the intra-manifold manipulation signal (e.g., 256) as the frequency selectivity is sufficient, in this case, for isolating the selected S manifold state(s) 262.

At block 506, the controller 30 controls the second manipulation source(s) 64B to generate and provide second manipulation signals 204, 254, 302 to the particular region 55. In various embodiments, the second manipulation signals are characterized by at least a second wavelength $\lambda_2$ corresponding to a transition between the a first pumped manifold (e.g., a D manifold 220, 270) and a second pumped manifold (e.g., a P manifold 230, 280) and/or a transition between a pumped manifold (e.g., P manifold 320) and the ground manifold 310. In an example embodiment wherein the atomic object is singly ionized atomic Barium, the second wavelength $\lambda_2$ is substantially equal to 614 nm or 493 nm.

In an example embodiment, blocks 504 and 506 are performed sequentially and repeated for a particular amount of time. In an example embodiment, blocks 504 and 506 are performed in parallel (e.g., at the same time and/or at least partially overlapping in time). As a result of the application of the first manipulation signals and/or the second manipulations signals to the atomic object, the probability of the atomic object being in one of the selected ground manifold state(s) increases. As the application of the first manipulation signals and/or second manipulation signals are continued and/or repeated, the probability of the atomic object being in one of the selected ground manifold state(s) increases to substantially equal to one-hundred percent. In various embodiments, the first and/or second manipulations signals are applied to a plurality of atomic objects within the atomic object confinement apparatus. In various embodiments, blocks 504 and 506 correspond to initializing and/or performing state preparation for one or more atomic objects to be used as qubits in the performance of a quantum program prior to the beginning of the quantum program being executed by the quantum computer 110.

At block 508, the controller 30 causes the quantum computer 110 to begin performance and/or execution of a quantum circuit. For example, the controller 30 may control voltage sources of the quantum computer 110, manipulation sources 64, magnetic field generator 70, and/or the like to cause the quantum computer 110 to perform a controlled quantum state evolution of qubits (e.g., atomic objects confined by the atomic object confinement apparatus 50).

At step/operation 510, the controller 30 determines that an initializing trigger has been identified. For example, as the controller 30 controls the quantum computer 110 and/or components thereof, the controller 30 determines that an initializing trigger has been identified. In an example embodiment, the initializing trigger is identified in response to performing a mid-circuit measurement, preparing to re-use a qubit (e.g., re-initialize the atomic object and use it as another qubit) and/or the like. In various embodiments, a variety of actions and/or planned actions may cause the controller 30 to determine that an initializing trigger has been identified. In various embodiments, the initializing trigger indicates the particular region 55 of the atomic object confinement apparatus 50 in which the initializing and/or state preparation operation is to be performed.

At step/operation 512, the controller 30 controls the first manipulation source(s) 64A to generate and provide first manipulation signals 202, 252, 256A, 256B to the particular region 55. In various embodiments, the first manipulation signals 202, 252 are characterized by at least a first wavelength $\lambda_1$ corresponding to a transition between the ground state manifold 210, 260 (e.g., non-selected ground manifold states 214, 264) and a D manifold of the atomic object 408. In an example embodiment, the first manipulation signals are characterized by an intra-manifold wavelength $\lambda_m$ configured to couple lower energy states of the non-selected ground manifold states 264 to higher energy states of the non-selected ground manifold states 264. In an example embodiment wherein the atomic object is singly ionized atomic Barium, the first wavelength $\lambda_1$ is substantially equal to 1762 nm and the intra-manifold wavelength $\lambda_m$ is substantially equal to the speed of light divided by 8 GHz. In various embodiments the first manipulation signals are characterized by a polarization that is configured to suppress the coupling of the selected ground manifold states 212, 262 to states of any of the pumped manifolds 220, 230, 270, 280, and/or the like. In an example embodiment, the polarization of the manipulation signal (e.g., 252) characterized by the first wavelength $\lambda_1$ is polarized (e.g., linearly polarized) substantially perpendicular the magnetic field direction. In an example embodiment, the system is not sensitive or dependent on the polarization of the intra-manifold manipulation signal (e.g., 256) as the frequency selectivity is sufficient, in this case, for isolating the selected S manifold state(s) 262.

At block 514, the controller 30 controls the second manipulation source(s) 64B to generate and provide second manipulation signals 204, 254, 302 to the particular region 55. In various embodiments, the second manipulation signals are characterized by at least a second wavelength 22 corresponding to a transition between the first pumped manifold (e.g., a D manifold 220, 270) and a second pumped manifold (e.g., a P manifold 230, 280) and/or a transition between a pumped manifold (e.g., P manifold 320) and the ground manifold 310. In an example embodiment wherein the atomic object is singly ionized atomic Barium, the second wavelength 22 is substantially equal to 614 nm or 493 nm.

In an example embodiment, blocks 512 and 514 are performed sequentially and repeated for a particular amount of time. In an example embodiment, blocks 512 and 514 are performed in parallel (e.g., at the same time and/or at least partially overlapping in time). As a result of the application of the first manipulation signals and/or the second manipulations signals to the atomic object, the probability of the atomic object being in one of the selected ground manifold state(s) increases. As the application of the first manipulation signals and/or second manipulation signals are continued and/or repeated, the probability of the atomic object being in one of the selected ground manifold state(s) increases to substantially equal to one-hundred percent. In various embodiments, the first and/or second manipulations signals are applied to a plurality of atomic objects within the atomic object confinement apparatus. For example, the application of the first manipulation signals and/or the second manipulation signals may be performed for a period of time corresponding to the probability of the atomic object being in one of the selected ground manifold states being substantially equal to 100 percent, in an example embodiment. In an example embodiment, the application of the first manipulation signals and/or the second manipulation signals may be performed for up to and/or less than 1 ms in order to increase the probability of the atomic object being in one of the selected ground manifold states to substantially equal to 100 percent. In various embodiments, blocks 512 and 514 correspond to initializing and/or performing state preparation for one or more atomic objects in the middle of performing and/or executing a quantum program. For example, blocks 512 and 514 may be performed to re-initialize and/or prepare a state of an atomic object (e.g., one that was measured mid-circuit) to be used as a qubit in the continued performance of a quantum program.

At step/operation 516, the controller 30 controls various elements of the quantum computer 110 (e.g., voltage sources, manipulation sources 64, magnetic field generators 70, and/or the like) to continue performing and/or executing the quantum circuit. For example, the controller 30 may control various elements of the quantum computer 110 to cause one or more atomic objects to be transported into, out of, and/or within the particular region 55, perform one or more quantum gates on one or more atomic objects, read a state of one or more atomic objects and/or components of atomic objects, and/or the like.

Technical Advantages

In atomic objects having a nuclear spin greater than ½, the ground manifold comprises a plurality of states. For example, the ground state of the atomic object is split into a plurality of states (e.g., via Zeeman splitting) to form the ground manifold. For example, the ground manifold comprises states having the same principle quantum number (n) and the same angular momentum quantum number (l). However, the states of the ground manifold have different magnetic quantum numbers ($m_j$). Due to the interaction between the magnetic moment caused by the nuclear spin and the magnetic moment caused by the electron spins of the atomic object, the states having different magnetic quantum numbers ($m_j$) are split into different energy levels. These different energy levels are separated by relatively small energies compared to the energy differences between the ground manifold and one or more pumping manifolds of the atomic object energy level structure.

Given that real world lasers do not have frequency spectra that are perfectly stable Dirac delta functions, it is difficult to address atomic objects that are in a non-selected ground manifold state without perturbing an atomic object that is already in a selected ground manifold state. However, for the atomic object to be used as a qubit of a quantum computer and/or to be used for performing experiments, controlled quantum state evolution, quantum computations, and/or the like, the initial state of the atomic object must be controllable. Therefore, technical problems exists regarding how to initialize an atomic object into a selected ground manifold state. In particular, technical problems exist regarding how to initialize an atomic object into selected ground manifold state when the atomic object has a nuclear spin greater than ½, which leads to additional splitting of the ground manifold of the atomic object based into both fine structure and hyperfine structure.

Embodiments described herein provide technical solutions to these technical problems. In particular, according to various embodiments, first manipulation signals are generated and applied to one or more atomic objects. The first manipulation signals are configured to couple one or more non-selected ground manifold states to states in a pumped manifold. For example, the first manipulation signals are configured to pump atomic objects in one of the one or more non-selected ground manifold states into a pumped manifold state. In various embodiments, there is a non-zero probability that the atomic object will decay from the pumped manifold state into a selected ground manifold state. The first manipulation signals are configured to not couple the selected ground manifold state to any of the pump manifold states. For example, based on the direction of propagation of the first manipulation signals compared to the magnetic field direction, the polarization of the first manipulation signals, and the use of a narrow line manipulation signal that is shifted from resonance for the selected ground manifold state (e.g., with respect to a transition to a pumped manifold state), and/or the like, may be used to suppress the probability that an atomic object will be coupled out of and/or transition out of a selected ground manifold state. In various embodiments, second manipulation signals are generated and applied to the atomic objects. In various embodiments, second manipulation signals are applied to the atomic object to flush out at least one manifold of the one or more pump manifolds. For example, the second manipulation signals may be a dipole signal configured to cause atomic objects to decay from a pumped manifold state into the selected ground manifold state with a non-zero probability.

As the application of the first manipulation signals and/or second manipulation signals are continued and/or repeated, the probability of the atomic object being in one of the selected ground manifold state(s) increases to substantially equal to one-hundred percent. In various embodiments, the first and/or second manipulations signals are applied to a plurality of atomic objects within the atomic object confinement apparatus.

In various embodiments, the selected ground manifold state is a state in a defined qubit space of the atomic object energy level structure. In an example embodiment, the selected ground manifold state is an $m_f=0$ state (e.g., F=2, $m_f=0$; F=1, $m_f=0$; and/or the like). In various embodiments, the non-selected ground manifold states are not within and/or not part of the defined qubit space of the atomic object energy level structure. In various embodiments, the one or more pumped manifolds are the $D_{5/2}$ manifold, the $P_{1/2}$ manifold, and/or the $P_{3/2}$ manifold of the atomic object energy level structure.

Thus, various embodiments enable the use of high nuclear spin atomic objects (e.g., atomic objects with spin greater than ½) to be effectively and reliably initialized and/or to be state prepared into a selected ground manifold state.

Exemplary Controller

In various embodiments, a quantum computer 110 comprises a controller 30 configured to control various elements of the quantum computer 110. In various embodiments, a controller 30 may be configured to cause a quantum computer 110 to perform various operations (e.g., computing operations such as gate operations, cooling operations, transport operations, qubit interaction operations, qubit measurement operations; leakage suppression/transformation operations; qubit initialization and/or state preparation operations; and/or the like). For example, the controller 30 may be configured to initialize and/or prepare a state of one or more atomic objects by causing the application of first manipulation signals and second manipulation signals thereto, and/or the like. For example, the controller 30 may be configured to control a cryogenic system and/or vacuum system controlling the temperature and pressure within the cryogenic and/or vacuum chamber 40, manipulation sources 64, voltage sources configured to apply voltage signals to electrodes of the atomic object confinement apparatus 50, magnetic field generators 70, and/or systems controlling the environmental conditions (e.g., temperature, humidity, pressure, and/or the like) within the cryogenic and/or vacuum chamber 40 and/or configured to manipulate and/or cause a controlled evolution of quantum states of one or more atomic objects within the atomic object confinement apparatus 50.

As shown in FIG. 6, in various embodiments, the controller 30 may comprise various controller elements including processing elements 605, memory 610, driver controller elements 615, a communication interface 620, analog-digital converter elements 625, and/or the like. For example, the processing elements 605 may comprise programmable logic devices (CPLDs), microprocessors, coprocessing entities, application-specific instruction-set processors (ASIPs), integrated circuits, application specific integrated circuits (ASICs), field programmable gate arrays (FPGAs), programmable logic arrays (PLAs), hardware accelerators, other processing devices and/or circuitry, and/or the like. and/or controllers. The term circuitry may refer to an entirely hardware embodiment or a combination of hardware and computer program products. In an example embodiment, the processing element 605 of the controller 30 comprises a clock and/or is in communication with a clock.

For example, the memory 610 may comprise non-transitory memory such as volatile and/or non-volatile memory storage such as one or more of as hard disks, ROM, PROM, EPROM, EEPROM, flash memory, MMCs, SD memory cards, Memory Sticks, CBRAM, PRAM, FeRAM, RRAM, SONOS, racetrack memory, RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. In various embodiments, the memory 610 may store qubit records corresponding to the qubits of the quantum computer (e.g., in a qubit record data store, qubit record database, qubit record table, and/or the like), a calibration table, an executable queue, computer program code (e.g., in a one or more computer languages, specialized controller language(s), and/or the like), and/or the like. In an example embodiment, execution of at least a portion of the computer program code stored in the memory 610 (e.g., by a processing element 605) causes the controller 30 to perform one or more steps, operations, processes, procedures and/or the like described herein.

In various embodiments, the driver controller elements 615 may include one or more drivers and/or controller elements each configured to control one or more drivers. In various embodiments, the driver controller elements 615 may comprise drivers and/or driver controllers. For example, the driver controllers may be configured to cause one or more corresponding drivers to be operated in accordance with executable instructions, commands, and/or the like scheduled and executed by the controller 30 (e.g., by the processing element 605). In various embodiments, the driver controller elements 615 may enable the controller 30 to operate and/or control one or more manipulation sources 64, control one or more magnetic field generators 70, operate vacuum and/or cryogenic systems, and/or the like. In various embodiments, the drivers may be laser drivers; vacuum component drivers; voltage sources (e.g., AC voltage sources, arbitrary waveform generators (AWG), direct digital synthesizers (DDS), and/or the like); cryogenic and/or vacuum system component drivers; and/or the like. In various embodiments, the controller 30 comprises means for communicating and/or receiving signals from one or more optical receiver components such as cameras, MEMs cameras, CCD cameras, photodiodes, photomultiplier tubes, and/or the like. For example, the controller 30 may comprise one or more analog-digital converter elements 625 configured to receive signals from one or more optical receiver components, calibration sensors, and/or the like. For example, the controller 30 may receive measurements corresponding to conditions in particular regions 55 of the atomic object confinement apparatus 50 and/or corresponding to various atomic objects 308 via the analog-digital converter elements 625.

In various embodiments, the controller 30 may comprise a communication interface 620 for interfacing and/or communicating with a computing entity 10. For example, the controller 30 may comprise a communication interface 620 for receiving executable instructions, command sets, and/or the like from the computing entity 10 and providing output received from the quantum computer 110 (e.g., from an optical collection system or other measurement system) and/or the result of a processing the output to the computing entity 10. In various embodiments, the computing entity 10 and the controller 30 may communicate via a direct wired and/or wireless connection and/or one or more wired and/or wireless networks 20.

Exemplary Computing Entity

FIG. 7 provides an illustrative schematic representative of an example computing entity 10 that can be used in conjunction with embodiments of the present invention. In various embodiments, a computing entity 10 is configured to allow a user to provide input to the quantum computer 110 (e.g., via a user interface of the computing entity 10) and receive, display, analyze, and/or the like output from the quantum computer 110. For example, a user may operate a computing entity 10 to generate and/or program a quantum algorithm and/or quantum circuit that may be provided such that the controller 30 may receive the quantum algorithm and/or quantum circuit and cause the quantum computer 110 to perform the quantum algorithm and/or quantum circuit.

As shown in FIG. 7, a computing entity 10 can include an antenna 712, a transmitter 714 (e.g., radio), a receiver 706 (e.g., radio), and a processing device and/or element 708 that provides signals to and receives signals from the transmitter 714 and receiver 706, respectively. The signals provided to and received from the transmitter 714 and the receiver 706, respectively, may include signaling information/data in accordance with an air interface standard of applicable wireless systems to communicate with various entities, such as a controller 30, other computing entities 10, and/or the like. In this regard, the computing entity 10 may be capable of operating with one or more air interface standards, communication protocols, modulation types, and access types. For example, the computing entity 10 may be configured to receive and/or provide communications using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 10 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The computing entity 10 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Via these communication standards and protocols, the computing entity 10 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The computing entity 10 can also download changes, add-ons, and updates, for instance, to its firmware, software (e.g., including executable instructions, applications, program modules), and operating system. In various embodiments, the computing entity 10 comprises a network interface 720 configured for communicating via one or more wired and/or wireless networks 20.

The computing entity 10 may also comprise a user interface device comprising one or more user input/output interfaces (e.g., a display 716 and/or speaker/speaker driver coupled to a processing device and/or element 708 and a touch screen, keyboard, mouse, and/or microphone coupled to a processing device and/or element 708). For instance, the user output interface may be configured to provide an application, browser, user interface, interface, dashboard, screen, webpage, page, and/or similar words used herein interchangeably executing on and/or accessible via the computing entity 10 to cause display or audible presentation of information/data and for interaction therewith via one or more user input interfaces. The user input interface can comprise any of a number of devices allowing the computing entity 10 to receive data, such as a keypad 718 (hard or soft), a touch display, voice/speech or motion interfaces, scanners, readers, or other input device. In embodiments including a keypad 718, the keypad 718 can include (or cause display of) the conventional numeric (0-9) and related keys (#, *), and other keys used for operating the computing entity 10 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the computing entity 10 can collect information/data, user interaction/input, and/or the like.

The computing entity 10 can also include volatile storage or memory 722 and/or non-volatile storage or memory 724, which can be embedded and/or may be removable. For instance, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the computing entity 10.

CONCLUSION

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for initializing an atomic object confined by an atomic object confinement apparatus, the method comprising:
controlling, by a controller associated with the atomic object confinement apparatus, a first manipulation source to provide a first manipulation signal to a particular region of the atomic object confinement apparatus, wherein the atomic object has a nuclear spin greater than one half, a ground state manifold of the atomic object comprises one or more selected ground manifold states and one or more non-selected ground manifold states, and the first manipulation signal is configured to drive transitions from at least one of the one or more non-selected ground manifold states to one or more pumped manifolds of the atomic object and suppress transitions out of the selected ground manifold states; and
controlling, by the controller, a second manipulation source to provide a second manipulation signal to the particular region of the atomic object confinement apparatus to stimulate the atomic object to decay from at least one of the one or more pumped manifolds into a decayed state within the ground manifold, wherein there is a non-zero probability that the decayed state is one of the selected ground manifold states,
wherein the atomic object to be initialized is located in the particular region of the atomic object confinement apparatus.

2. The method of claim 1, wherein a polarization of the first manipulation signal is configure to suppress transitions from the one or more selected ground manifold states to the one or more pumped manifolds.

3. The method of claim 1, wherein a propagation direction of the first manipulation signal is perpendicular to a magnetic field direction in the particular region of the atomic object confinement apparatus.

4. The method of claim 1, wherein the first manipulation signals comprise intra-manifold signals and inter-manifold signals.

5. The method of claim 4, wherein the atomic object is a singly ionized barium atom and the intra-manifold signals are characterized by a frequency substantially equal to 8 GHz and the inter-manifold signals are characterized by a wavelength substantially equal to 1762 nm.

6. The method of claim 1, wherein the one or more selected ground manifold states at least partially define a set of qubit states of the atomic object.

7. The method of claim 1, wherein the method is performed at least one of (a) prior to the execution of a quantum program by a quantum computer controlled by the controller or (b) to re-initialize an atomic object into a qubit space of the quantum computer during the execution of the quantum program by the quantum computer.

8. The method of claim 1, wherein the atomic object is a singly ionized barium atom and the second manipulation signals are characterized by at least one of (a) a wavelength substantially equal to 614 nm or (b) a wavelength substantially equal to 493 nm.

9. An apparatus comprising at least one processor and memory storing computer-executable instructions, the computer-executable instructions configured to, when executed by the at least one processor, cause the apparatus to at least:
control a first manipulation source to provide a first manipulation signal to a particular region of an atomic object confinement apparatus, wherein the atomic object has a nuclear spin greater than one half, a ground state manifold of the atomic object comprises one or more selected ground manifold states and one or more non-selected ground manifold states, and the first manipulation signal is configured to drive transitions from at least one of the one or more non-selected ground manifold states to one or more pumped manifolds of the atomic object and suppress transitions out of the selected ground manifold states; and
control a second manipulation source to provide a second manipulation signal to the particular region of the atomic object confinement apparatus to stimulate the atomic object to decay from at least one of the one or more pumped manifolds into a decayed state within the ground manifold, wherein there is a non-zero probability that the decayed state is one of the selected ground manifold states, wherein the atomic object to be initialized is located in the particular region of the atomic object confinement apparatus.

10. The apparatus of claim 9, wherein the apparatus is a controller of a quantum computer comprising the atomic object confinement apparatus, the first manipulation source, and the second manipulation source.

11. The apparatus of claim 9, wherein a polarization of the first manipulation signal is configure to suppress transitions from the one or more selected ground manifold states to the one or more pumped manifolds.

12. The apparatus of claim 9, wherein a propagation direction of the first manipulation signal is perpendicular to a magnetic field direction in the particular region of the atomic object confinement apparatus.

13. The apparatus of claim 9, wherein the first manipulation signals comprise intra-manifold signals and inter-manifold signals.

14. The apparatus of claim 13, wherein the atomic object is a singly ionized barium atom and the intra-manifold signals are characterized by a frequency substantially equal to 8 GHz and the inter-manifold signals are characterized by a wavelength substantially equal to 1762 nm.

15. The apparatus of claim 9, wherein the one or more selected ground manifold states at least partially define a set of qubit states of the atomic object.

16. The apparatus of claim 9, wherein the first and second manipulation signals are applied to the atomic object at least one of (a) prior to the execution of a quantum program by a quantum computer controlled by the controller or (b) to re-initialize an atomic object into a qubit space of the quantum computer during the execution of the quantum program by the quantum computer.

17. The apparatus of claim 9, wherein the atomic object is a singly ionized barium atom and the second manipulation signals are characterized by at least one of (a) a wavelength substantially equal to 614 nm or (b) a wavelength substantially equal to 493 nm.

18. A system comprising:
an atomic object confinement apparatus configured to confine an atomic object in a particular region of the atomic object confinement apparatus;
one or more first manipulation sources controllable by a controller of the system and configured to provide first manipulation signals to the particular region of the atomic object confinement apparatus;
one or more second manipulation sources controllable by the controller of the system and configured to provide second manipulation signals to the particular region of the atomic object confinement apparatus; and
the controller comprising at least one processor and memory storing computer-executable instructions, the computer-executable instructions configured to, when executed by the at least one processor, cause the controller to at least:
control a first manipulation source to provide a first manipulation signal to a particular region of an atomic object confinement apparatus, wherein the atomic object has a nuclear spin greater than one half, a ground state manifold of the atomic object comprises one or more selected ground manifold states and one or more non-selected ground manifold states, and the first manipulation signal is configured to drive transitions from at least one of the one or more non-selected ground manifold states to one or more pumped manifolds of the atomic object and suppress transitions out of the selected ground manifold states; and
control a second manipulation source to provide a second manipulation signal to the particular region of the atomic object confinement apparatus to stimulate the atomic object to decay from at least one of the one or more pumped manifolds into a decayed state within the ground manifold, wherein there is a non-zero probability that the decayed state is one of the selected ground manifold states,
wherein the atomic object to be initialized is located in the particular region of the atomic object confinement apparatus.

19. The system of claim 18, wherein system is part of a quantum computer and the first and second manipulation signals are applied to the atomic object at least one of (a) prior to the execution of a quantum program by the quantum computer controlled by the controller or (b) to re-initialize an atomic object into a qubit space of the quantum computer during the execution of the quantum program by the quantum computer.

20. The system of claim 19, wherein at least one of (a) a polarization of the first manipulation signal is configure to suppress transitions from the one or more selected ground manifold states to the one or more pumped manifolds or (b) a propagation direction of the first manipulation signal is perpendicular to a magnetic field direction in the particular region of the atomic object confinement apparatus.

* * * * *